(12) United States Patent
Morris

(10) Patent No.: US 6,654,862 B2
(45) Date of Patent: Nov. 25, 2003

(54) HIGH PERFORMANCE DISK MIRRORING

(75) Inventor: J. Mark Morris, Poway, CA (US)

(73) Assignee: NCR Corporation, Dayton, OH (US)

( * ) Notice: Subject to any disclaimer, the term of this patent is extended or adjusted under 35 U.S.C. 154(b) by 367 days.

(21) Appl. No.: 09/752,356

(22) Filed: Dec. 29, 2000

(65) Prior Publication Data

US 2002/0087788 A1 Jul. 4, 2002

(51) Int. Cl.$^7$ .............................................. G06F 12/16
(52) U.S. Cl. ............................ 711/162; 711/4; 711/111; 711/114
(58) Field of Search ............................ 711/4, 111, 114, 711/162

(56) References Cited

PUBLICATIONS

DaGiau, Gianna et al., "Delivering System Performance Requirements Using Fewer Drives", PowerSolutions pp 55–61 Nov. 2002.*

* cited by examiner

*Primary Examiner*—Jack A. Lane
(74) *Attorney, Agent, or Firm*—John D. Cowart

(57) ABSTRACT

A set of storage disks includes a mirrored pair of disks. Each disk in the pair includes a mirror copy of data stored on the other disk in the pair. For each of the disks in the pair, the data forming the mirror copy is physically located between the center of the disk and the data that is mirrored on the other disk.

20 Claims, 6 Drawing Sheets

HIGH PERFORMANCE DISK MIRRORING

BACKGROUND

The typical computer disk drive includes a stack of one or more circular platters and at least one mechanical arm with a read/write head for each surface of each of the platters. The read/write heads read data from or write data to circular tracks on the platters as the platters rotate. The term "cylinder" is often used to describe a set of circular tracks, all lying on different disk surfaces at the same radial distance from the centers of the platters.

In accessing a block of addressed data on a particular surface, the mechanical arm positions the corresponding read/write head to the track that stores the data. This movement of the read/write head to the appropriate track is generally called a "seek." The read/write head accesses the targeted block of data when that block rotates to the position of the read/write head. The amount of time required for completing a read or write operation is dominated by the seek-time of the read/write head, the rotation time of the disk, and the data-transfer time. The seek-time is a function of the physical distance traveled by the mechanical arm in moving to the appropriate track.

"Short-stroking" is a disk-access technique that involves confining the range-of-movement of the mechanical arm to a small portion of the available cylinders in a disk drive, usually those lying only on the outer tracks of the disks in the drive. Short-stroking improves performance by reducing the distance traveled by the mechanical arm during most disk accesses and thus reducing average seek-time.

Many data-storage systems ensure data integrity and availability by "mirroring" the data stored on each disk. Mirroring involves storing a primary copy of data on one disk and a duplicate copy, or "mirror," on another disk drive.

FIG. 1A shows a computing system 100 that uses mirroring to ensure the integrity and availability of data. The system 100 includes one or more central processing units (CPU), or processors 105, that perform certain operations on data in the system. Each processor 105 executes program instructions that are stored, at least temporarily, in one or more volatile or non-volatile memory devices 110, such as a random-access memory (RAM) or read-only memory (ROM) chipset. Much of the data provided to and produced by the processor 105 during these operations is stored on the disk drives 115, 120 in one or more disk subsystems 125. In each subsystem, a hardware controller 130 governs the manner and locations in which data is stored on the disk drives 115, 120. FIG. 1B shows an implementation in which the mirrored disk drives 115, 120 are managed by separate hardware controllers 130, 132.

FIG. 2 shows a common mirroring technique, in which one disk drive 115 serves as the primary disk and another disk drive 120 serves as the mirror disk. The mirror disk 120 stores a mirror copy of all or some portion of the data stored on the primary disk 115. In this example, the disk controller makes essentially the entire surface of each disk available for data storage. As a result, the read/write heads must seek over the entire surface of the primary disk 115 for many read and write operations and must seek over the entire surface of the mirror disk 120 for many write operations. Because all read operations are directed to the primary disk 115, this technique subjects the primary disk to much heavier use than the mirror disk 120.

FIG. 3 shows a mirroring technique that offers better performance than the technique shown in FIG. 1. This technique uses the short-stroking effect to limit the distance traveled by the read/write heads and therefore to reduce the seek-time associated with the disks 115, 120. The disk controller stores data only on the outer portions 135, 140 of the disks 115, 120, leaving the inner portions 145, 150 of the disks unused.

As with the technique shown in FIG. 1, the disk controller stores the primary copy of all data on one disk 115 and the mirror copy on another disk 120. Therefore, this technique also subjects one of the disks to much heavier use than the other.

FIG. 4 shows another mirroring technique that relies on the short-stroking effect. With this technique, the disk controller divides the recording tracks on each disk into distinct groups, or extents, and stores primary and mirror copies of data on alternating extents on each disk. In the example shown here, the disk controller stores the primary copy of one set of data on the outer tracks, or outer extent 155, of one of the disks 115 ("Disk A") and stores the mirror copy of that data on the outer extent 160 of the other disk 120 ("Disk B"). The disk controller then stores the primary copy of another set of data on the inner tracks, or inner extent 165, of Disk B and stores the mirror copy of that data on the inner extent 170 of Disk A. This technique more evenly distributes the workloads of the two disks by placing primary copies of data on both disks, thus ensuring that read operations are directed to both disks.

The short-stroking techniques shown in FIG. 3 and FIG. 4 improve disk-drive performance, as described above, by limiting the distance over which the read/write heads must travel to access data. However, these techniques also leave a large portion of each disk unused, reducing the total storage capacity of the disk drive and thus driving up the cost of disk storage in the system. In all of the techniques of FIGS. 2–4, the primary copy and the mirror copy of each block of data start at the same relative positions, or track offsets, on their respective disks.

SUMMARY

A set of storage disks includes a mirrored pair of disks. Each disk in the pair includes a mirror copy of data stored on the other disk in the pair. For each of the disks in the pair, the data forming the mirror copy is physically located between the physical center of the disk and the data that is mirrored on the other disk.

Other features and advantages will become apparent from the description and claims that follow.

DETAILED DESCRIPTION

Figure 1A:
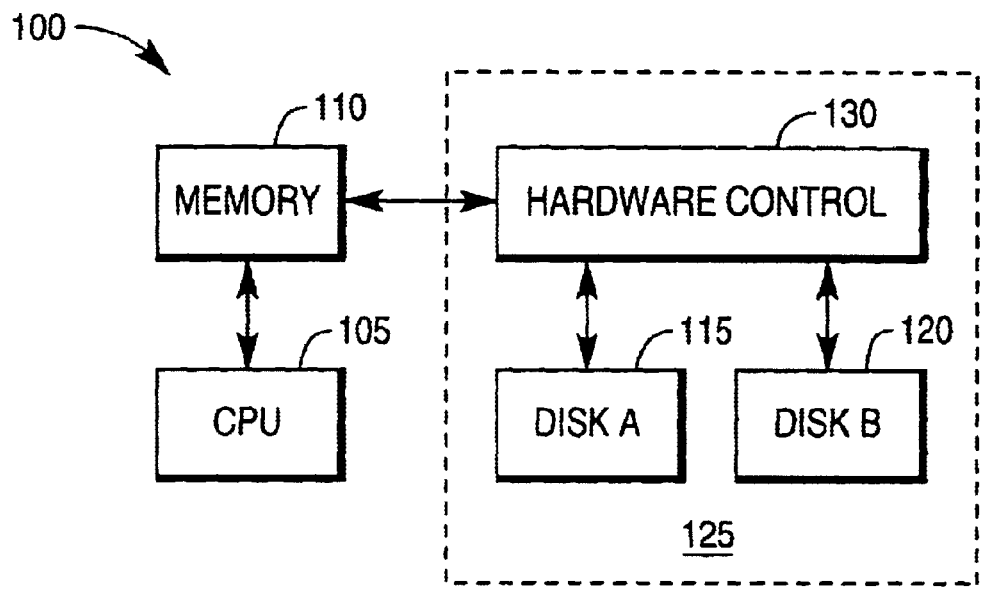
FIGS. 1A and 1B are generalized block diagrams of a computer system.
Figure 1B:
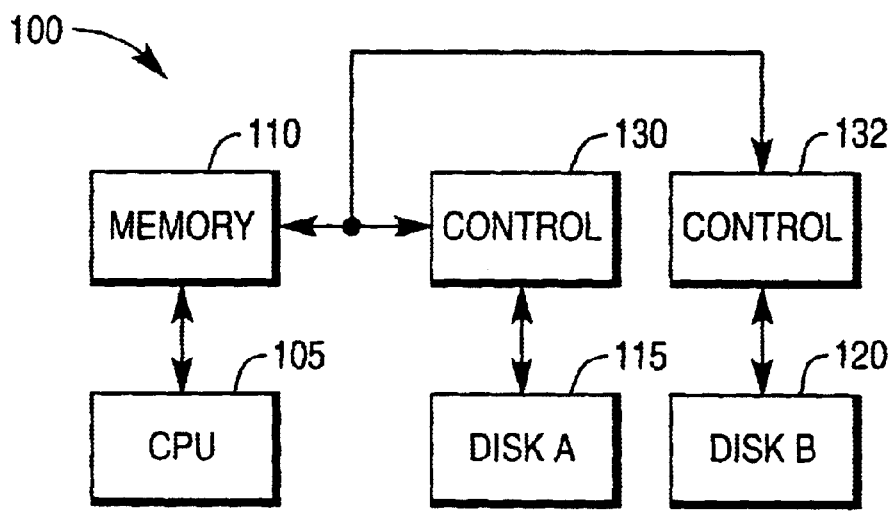
Figure 2:
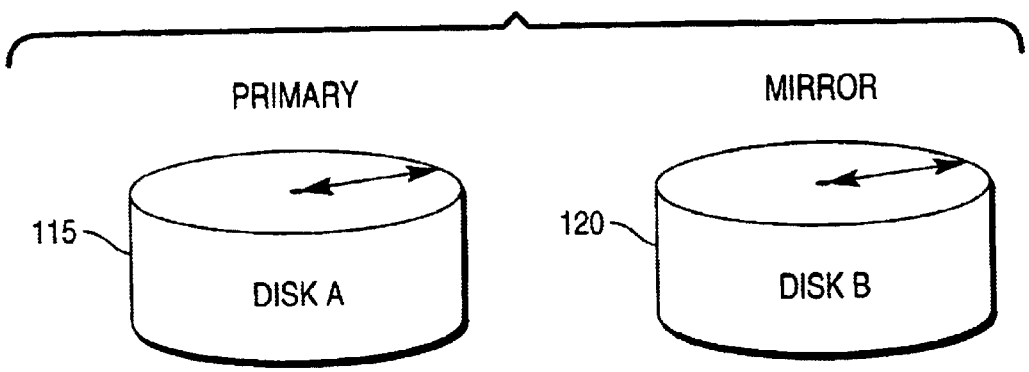
FIGS. 2, 3, and 4 are schematic diagrams showing three conventional techniques for storing data on mirrored disks.
Figure 3:
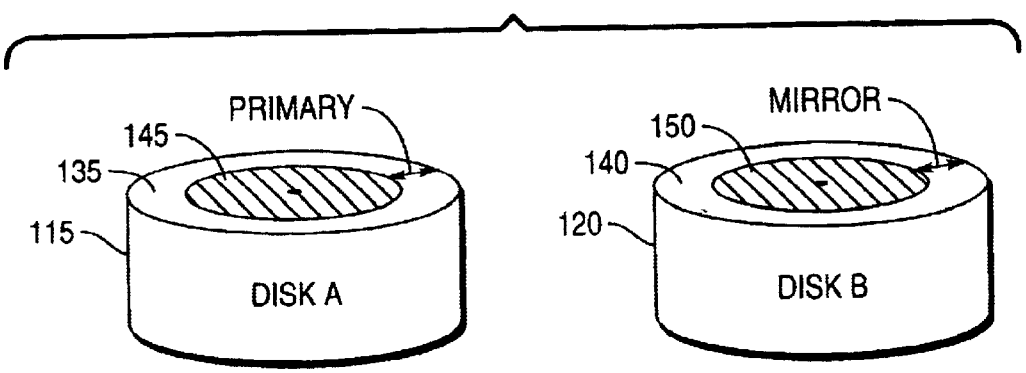
Figure 4:
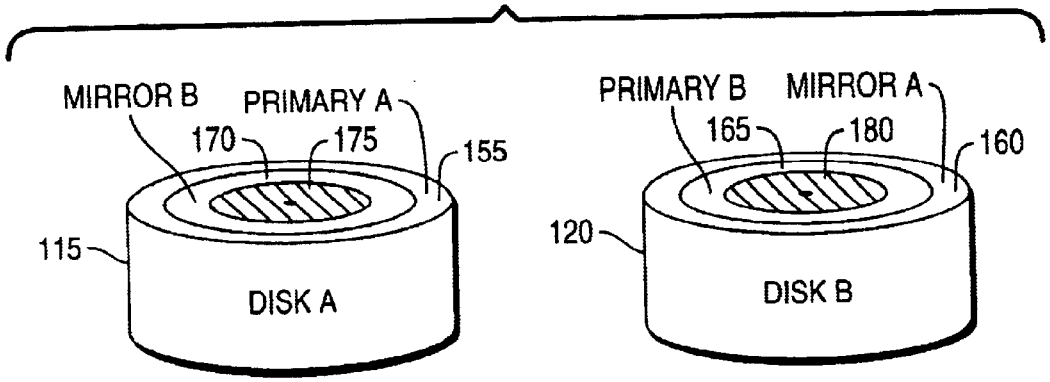
Figure 5:
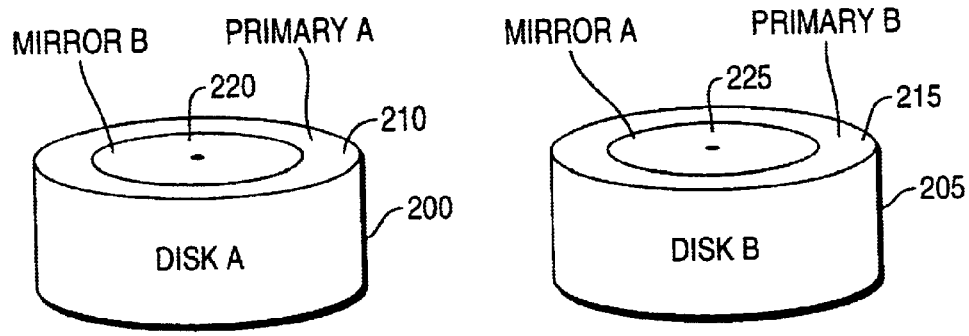
FIG. 5 is a schematic diagram showing a new technique for storing data on mirrored disks.

FIG. 5 shows a disk-mirroring technique that provides the performance benefits of short-stroking without sacrificing the storage capacity of the mirrored disks 200, 205. One or more storage subsystems, each including a disk controller similar to that shown in FIG. 1 above, store data across the surfaces of the disks in a manner that ensures that most access operations are directed to the outer portions of the disks. The storage subsystem divides each of the mirrored disks 200, 205 into at least two extents. All extents lying on the outer portions of the disks are used to store primary copies of data. All extents lying on the inner portions of the disks are used to store mirror copies of that data. In general, the primary and mirror copies of each data block are stored at different relative positions, or track offsets, on their respective disks. In most embodiments, the relative positions of the primary and mirror copies differ significantly.

For example, in FIG. 5, each disk drive 200, 205 is divided into two extents—one extent 210, 215 that includes the tracks lying on the outer half of the drive and one extent 220, 225 that includes the tracks lying on the inner half of the drive. The outer extent 210 on one of the drives ("Disk A") is used to store the primary copy of a set of data. The mirror copy of that data is stored on the inner extent 225 of the other drive ("Disk B"). Likewise, the outer extent 215 of Disk B is used to store the primary copy of another set of data, while the inner extent 220 of Disk A stores the mirror copy of that data.

Storing the data in this manner provides the benefits of short-stroking for most disk-access operations, yet still allows the system to use the full-storage capacity of each disk. For a mirrored pair of disks on which the primary extents cover exactly half of each disk's capacity and for which access patterns are random, all read operations and one-half of write operations are directed to the outer halves of the disks. The disk controller directs only one-half of all write operations to tracks on the inner halves of the disks.

The storage subsystem allocates a certain amount of space on each disk for primary data and a certain amount for mirror data. In some embodiments, the storage subsystem makes these allocations with knowledge of the characteristics of the data to be stored and thus allocates space accordingly. In other embodiments, the storage subsystem makes these allocations without any information about the data to be stored. In some embodiments, a human user determines how to allocate space on the disks and instructs the storage subsystem to allocate space accordingly.

Figure 6:
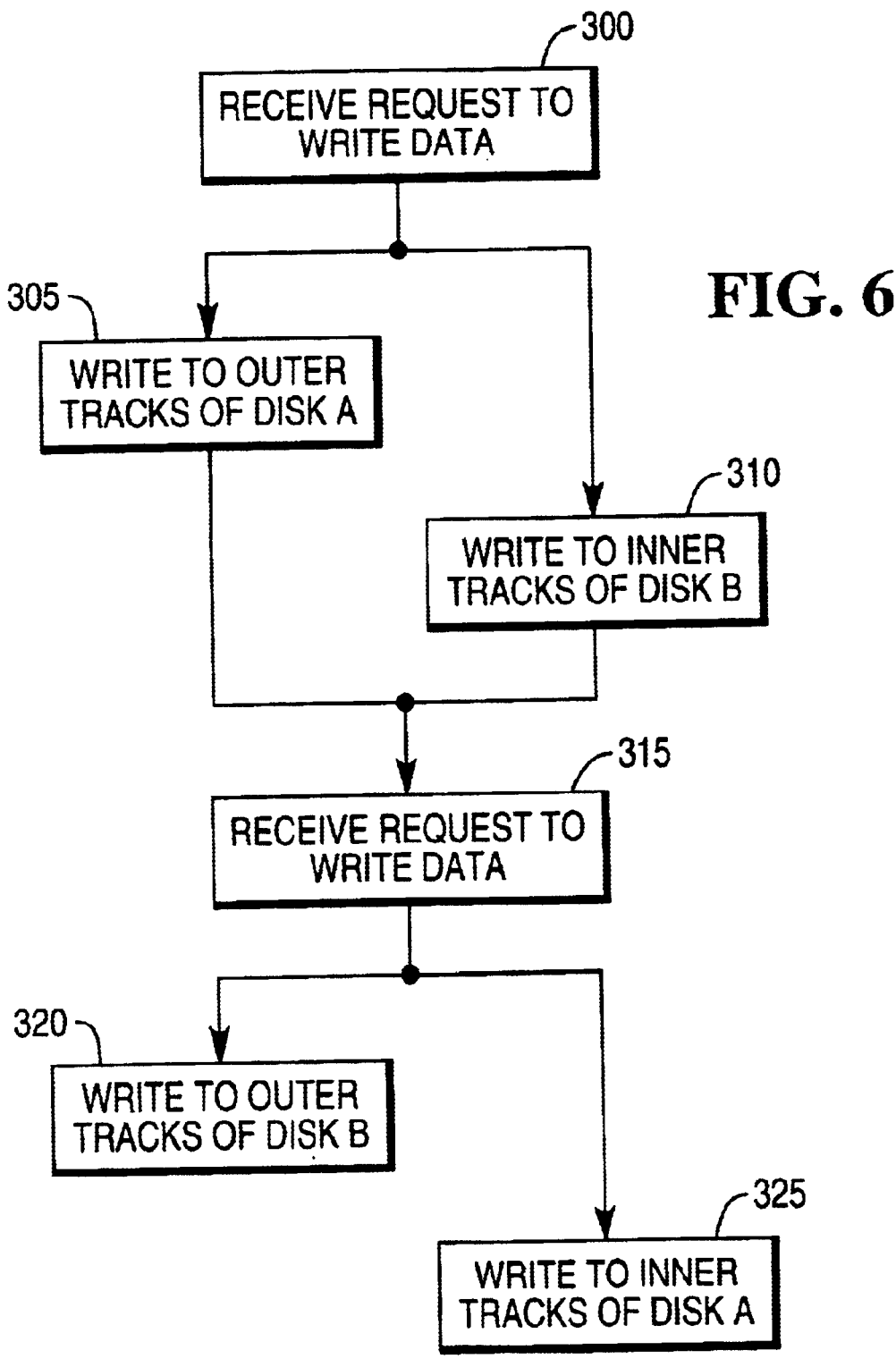
FIGS. 6 and 7 are flow charts of techniques for writing and reading data on mirrored disks.

FIG. 6 shows one technique for writing data to a pair of mirrored disks. The storage subsystem first receives a block of data along with an instruction to write that data to the disk drive (step 300). The subsystem stores the data to the outer tracks of one disk ("Disk A") (step 305) and to the inner tracks of the other disk ("Disk B") (step 310). For this data, Disk A serves as the primary and Disk B serves as the mirror.

At some point after the first write request arrives, the storage subsystem receives another block of data with a request to write that data to the disk drive (step 315). The subsystem stores this data to the outer tracks of Disk B (step 320) and to the inner tracks of Disk A (step 325). For this data, Disk B serves as the primary and Disk A serves as the mirror.

Upon receiving other write requests, the storage subsystem repeats these steps, storing data to the outer half of one disk and to the inner half of the other disk. The storage subsystem treats all of the data on the outer half of each disk as the primary copy and all of the data on the inner half of each disk as the mirror copy.

In practice, write requests are not necessarily handled in the serial manner shown here. The storage subsystem often executes many concurrent write requests in an order other than that in which the subsystem receives the requests.

Figure 7:
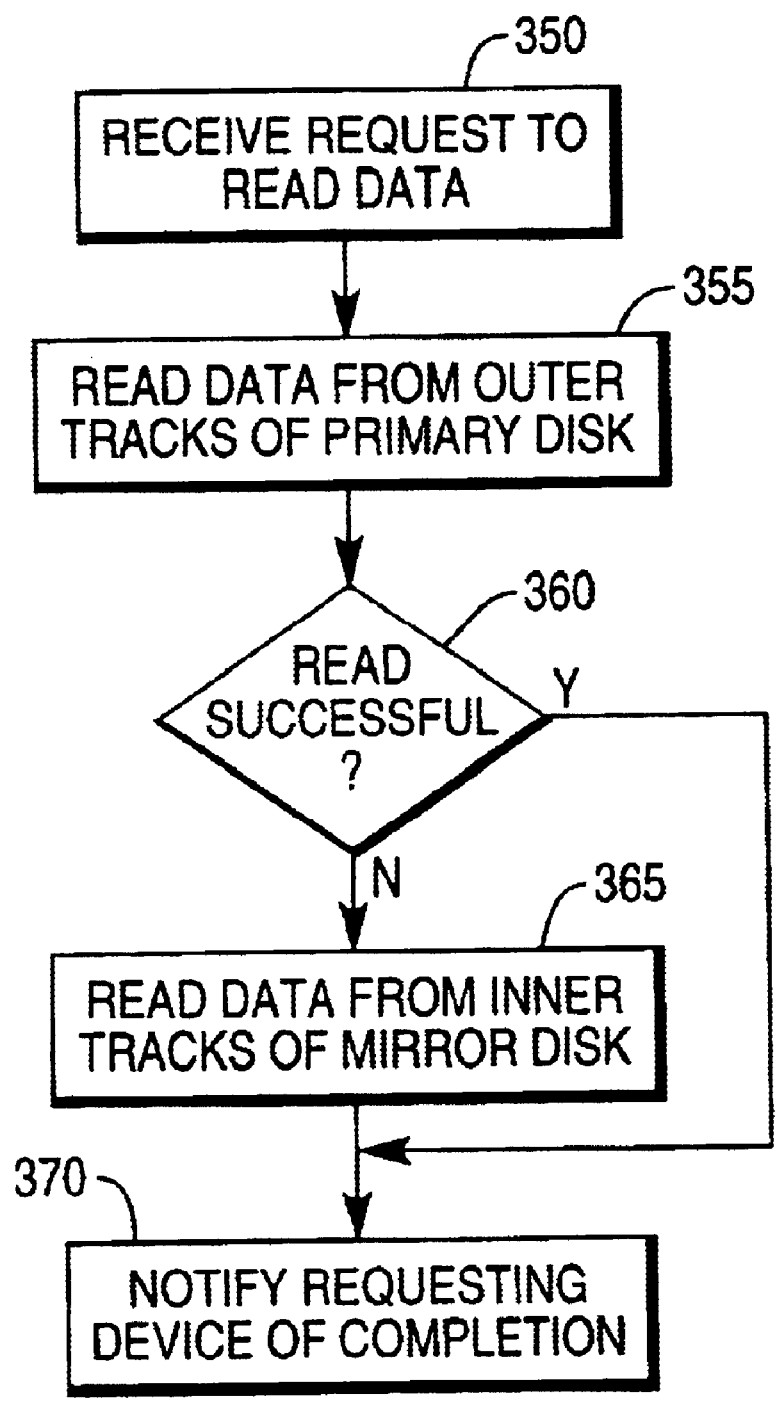

FIG. 7 shows a technique for reading data from the mirrored disks. The requesting device (CPU, I/O bus, etc.) delivers a read request to the storage subsystem (step 350). The storage subsystem responds by attempting to read the data from the outer tracks of the primary disk (step 355). If the subsystem is not successful in reading data from the primary disk (step 360), it reads the data from the inner tracks of the mirror disk (step 365). Upon successfully reading the requested data from either the primary or mirror disk, the storage subsystem delivers the data to the requesting device, along with a notification that the read was successful (step 370).

Figure 8:
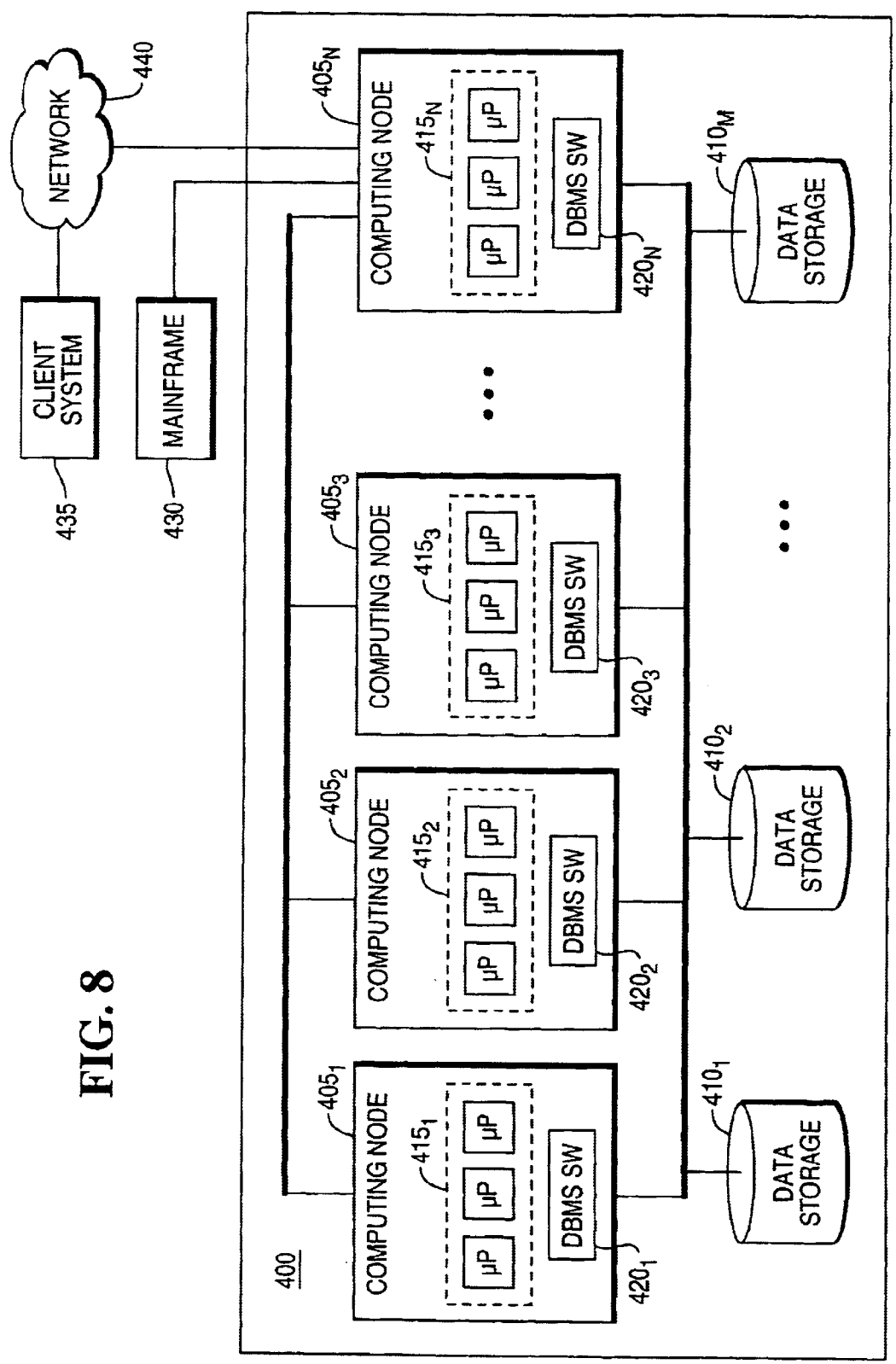
FIG. 8 is a block diagram of a data-storage-and-retrieval system.

FIG. 8 shows a data-storage-and-retrieval system 400, such as a high-end data warehousing system, in which the disk mirroring technique described here is particularly useful. The system 400 includes one or more computing nodes $405_{1 \ldots N}$ that manage the storage and retrieval of data in one or more data-storage facilities $410_{1 \ldots M}$. Each of the computing nodes $405_{1 \ldots N}$ is driven by a processing subsystem $415_{1 \ldots N}$ that includes one or more processing units, or CPUs. In general, all of the CPUs within a node share operating system and memory resources.

Within each node, the processing subsystem $415_{1 \ldots N}$ operates under the control of at least one instance $420_{1 \ldots N}$ of a database-management system (DBMS) program. In a data warehousing system built on a massively parallel processing (MPP) platform, each node runs several instances of the DBMS program, each forming a virtual processor that is assigned to manage some subset of the data in the storage facilities. Each DBMS process manages the assigned data in the database and governs access to the data by performing a prescribed set of operations on the data. In general, a user initiates these operations by delivering instructions through a remote computer system, such as a mainframe 430 connected directly to the database system or a client system 435 connected through a network 440. The user typically enters the instructions using a prescribed database-query language, such as the Structured Query Language (SQL) put forth by the American National Standards Institute (ANSI).

Each of the data-storage facilities $410_{1 \ldots M}$ includes an array of mirrored disk drives. Information requested by the mainframe 430 and client system 435 is retrieved from these disk drives by the computing nodes $405_{1 \ldots N}$. Quicker data retrieval in the data-storage facilities $410_{1 \ldots M}$ produces lower query-response times and thus improves overall system performance. Also, because the cost of the data-storage facilities $410_{1 \ldots M}$ is a significant component of overall system cost, more effective use of disk-storage capacity provides significant cost-savings opportunities.

The text above describes one or more specific embodiments of a broader invention. The invention also is carried out in a variety of alternative embodiments and thus is not limited to those described here. For example, in many systems, the mirrored disks are located in different storage subsystems and are managed by different disk controllers. In these situations, computer software is used to carry out the disk-mirroring scheme ("software mirroring").

In some embodiments, each disk drive in a mirrored set includes more than one primary extent and more than one mirror extent. In most of these systems, the storage subsystems attempt to spread the primary and mirror extents evenly among the disks in the mirrored set. Regardless of the number of extents on a disk, the storage subsystem places the primary extents on outer tracks and the mirror extents on inner tracks. Except for specific situations in which greater performance or disk-utilization improvements might result, all of the mirror extents on each disk lie between the innermost primary extent and the center point, or physical center, of the disk.

In many systems, the mirrored sets do not include exactly two disk drives. Some systems distribute primary and mirror extents over a greater number of disks. Many other embodiments are also within the scope of the following claims.

I claim:

1. A set of storage disks comprising a mirrored pair of disks, where each disk in the pair includes a mirror copy of data stored on the other disk in the pair, such that, on each of the disks in the pair, the data forming the mirror copy is physically located between the center of the disk and the data that is mirrored on the other disk.

2. The disks of claim 1, where at least one of the disks in the pair includes mirror copies of at least two sets of data stored on the other disk in the pair.

3. The disks of claim 1, where, on each disk in the pair, all data that forms a mirror copy is physically located between the center of the disk and all other data stored on the disk.

4. A storage subsystem for use in storing data on a mirrored pair of disks, where the storage subsystem is configured to store, on each disk in the pair, a mirror copy of data that is stored on the other disk in the pair, such that, on each of the disks in the pair, the data forming the mirror copy is physically located between the center of the disk and the data that is mirrored on the other disk.

5. A method for use in storing data on a mirrored pair of storage disks, the method comprising, for each disk:
   storing data on the disk; and
   storing a mirror copy of that data on the other disk;
   such that on each disk the mirror copy is physically located between the center of the disk and the data that is mirrored on the other disk.

6. A pair of mirrored disks, each comprising:
   a primary copy of data; and
   a mirror copy of at least some of the data stored on the other disk;
   where data is stored across substantially all tracks on both disks; and
   where, when both disks are functioning properly, all data that is read from each of the disks is read only from tracks lying at least a certain distance from the center of the disk.

7. The pair of mirrored disks of claim 6, where the data is stored such that, when both disks are functioning properly, all data that is read from each of the disks is read only from tracks lying on approximately the outer half of the disk.

8. A storage subsystem for use in storing data on a mirrored pair of disks, where the storage subsystem is configured to:
   store, on each disk in the pair, a primary copy of data and a mirror copy of at least some of the data stored on the other disk;
   distribute the data across substantially all tracks on both disks; and
   when both disks are functioning properly, read only from tracks lying at least a certain distance from the center of each disk.

9. The storage subsystem of claim 8, where the storage subsystem is configured to read data only from tracks lying on approximately the outer half of each disk when both disks are functioning properly.

10. A method for use in storing data on a pair of mirrored disks, the method comprising, for each disk:
    storing a primary copy of data on the disk;
    storing a mirror copy of at least some of the data stored on the other disk;
    distributing the data across substantially all tracks on the disk; and
    when both disks are functioning properly, reading data only from tracks lying at least a certain distance from the center of the disk.

11. The method of claim 10, where the step of reading data includes reading data only from tracks lying on approximately the outer half of the disk when both disks are functioning properly.

12. A set of storage disks comprising:
    one disk that includes a primary copy of a set of data stored at a selected track offset; and
    another disk that includes a mirror copy of the data stored at a track offset that differs from the track offset at which the primary copy is stored;
    where the disk that includes the primary copy of the data also includes a primary copy of at least one other set of data stored at a track offset that lies between the selected track offset and the track offset at which the mirror copy is stored on the other disk.

13. The set of storage disks of claim 12, where the disk that includes the primary copy of the data also includes a mirror copy of data stored on the other disk.

14. The set of storage disks of claim 12, where each disk is divided into an outer portion and an inner portion, and where each disk includes only primary copies of data on its outer portion and only mirror copies of data on its inner portion.

15. A storage subsystem for use in storing data on at least two storage disks, where the storage subsystem is configured to:
    store a primary copy of a set of data at a selected track offset on one of the disks;
    store a mirror copy of the data on the other disk at a track offset that differs substantially from the track offset at which the primary copy is stored; and
    store, on the disk that includes the primary copy of the data, a primary copy of at least one other set of data at a track offset that lies between the selected track offset and the track offset at which the mirror copy is stored on the other disk.

16. The storage subsystem of claim 15, where the storage subsystem is configured to store, on the disk that includes the primary copy of the data, a mirror copy of data that is stored on the other disk.

17. The storage subsystem of claim 15, where the storage subsystem is configured to divide each disk into an outer portion and an inner portion and to store only primary copies of data on the outer portion of each disk and only mirror copies of data on the inner portion of each disk.

18. A method for use in storing data on at least two storage disks, the method comprising:
    storing a primary copy of a set of data at a selected track offset on one of the disks;
    storing a mirror copy of the data on the other disk at a track offset that differs substantially from the track offset at which the primary copy is stored; and
    storing, on the disk that includes the primary copy of the data, a primary copy of at least one other set of data at a track offset that lies between the selected track offset and the track offset at which the mirror copy is stored on the other disk.

19. A data-storage-and-retrieval system comprising:

one or more processing subsystems configured to carry out data processing operations; and a storage subsystem configured to store data requested or produced by the processing subsystems, where the storage subsystem includes a mirrored pair of disks, each including a mirror copy of data stored on the other disk in the pair, such that, on each of the disks in the pair, the data forming the mirror copy is physically located between the center of the disk and the data that is mirrored on the other disk.

20. A data-storage-and-retrieval system comprising:

one or more processing subsystems configured to carry out data processing operations; and a storage subsystem configured to store data requested or produced by the processing subsystems, where the storage subsystem includes a pair of mirrored disks, each comprising:

a primary copy of data; and a mirror copy of at least some of the data stored on the other disk;

where data is stored across substantially all tracks on both disks; and where, when both disks are functioning properly, all data that is read from each of the disks is read only from tracks lying at least a certain distance from the center of the disk.

* * * * *